United States Patent
Rangavajjhala et al.

(10) Patent No.: US 8,074,054 B1
(45) Date of Patent: Dec. 6, 2011

(54) PROCESSING SYSTEM HAVING MULTIPLE ENGINES CONNECTED IN A DAISY CHAIN CONFIGURATION

(75) Inventors: Venkata Rangavajjhala, Fremont, CA (US); Naveen K. Jain, San Jose, CA (US)

(73) Assignee: Tellabs San Jose, Inc., Naperville, IL (US)

( * ) Notice: Subject to any disclaimer, the term of this patent is extended or adjusted under 35 U.S.C. 154(b) by 1027 days.

(21) Appl. No.: 11/954,718

(22) Filed: Dec. 12, 2007

(51) Int. Cl.
*G06F 15/00* (2006.01)
*G06F 15/76* (2006.01)

(52) U.S. Cl. .............................. 712/28; 712/29; 712/30

(58) Field of Classification Search .................. None
See application file for complete search history.

(56) References Cited

U.S. PATENT DOCUMENTS

| | | | | |
|---|---|---|---|---|
| 4,833,673 A | * | 5/1989 | Chao et al. ..................... | 370/537 |
| 4,899,339 A | * | 2/1990 | Shibagaki et al. ............ | 370/431 |
| 5,123,015 A | * | 6/1992 | Brady et al. .................. | 370/539 |
| 6,026,098 A | * | 2/2000 | Kamoi et al. ................. | 370/539 |
| 6,337,867 B1 | * | 1/2002 | Ejiri .............................. | 370/537 |
| 7,830,906 B2 | * | 11/2010 | Satoh et al. ................... | 370/423 |

\* cited by examiner

*Primary Examiner* — Corey S Faherty
(74) *Attorney, Agent, or Firm* — James M. Wu; JW Law Group

(57) ABSTRACT

A processing system includes a group of processing units ("PUs") arranged in a daisy chain configuration or a sequence capable of parallel processing. The processing system, in one embodiment, includes PUs, a demultiplexer ("demux"), and a multiplexer ("mux"). The PUs are connected or linked in a sequence or a daisy chain configuration wherein a first PU is located at the beginning of the sequence and a last digital PU is located at the end of the sequence. Each PU is configured to read an input data packet from a packet stream during a designated reading time frame. If the time frame is outside of the designated reading time frame, a PU allows a packet stream to pass through. The demux forwards a packet stream to the first digital processing unit. The mux receives a packet steam from the last digital processing unit.

16 Claims, 5 Drawing Sheets

US 8,074,054 B1

PROCESSING SYSTEM HAVING MULTIPLE ENGINES CONNECTED IN A DAISY CHAIN CONFIGURATION

FIELD

The exemplary embodiment(s) of the present invention relates to computer system architecture. More specifically, the embodiment(s) of the present invention relates to processor configurations.

BACKGROUND

With increasing demand in computing powers to meet rapidly growing electronic industries such as communications networks, various parallel processing systems have been constructed to meeting such demand. A conventional parallel processing system often employs multiple processing elements or engines in order to obtain results more quickly. A typical configuration of a conventional parallel processing system arranges its processors in a tandem layout, which creates a scenario in which all engines or processor compete for the same shared resources such as memory access. As such, a problem associated with a typical parallel processing system is routing congestion since all engines and shared resources are interconnected with each other.

A conventional approach to resolve routing congestion in a parallel processing system is to add routing channels which results in increased die size. In addition, due to the heavy loading experienced by the signals, the operating speed of the design will need to be reduced.

The conventional approach to address the increased signal loading is to add additional pipeline stages. This would shorten the signal traces between flip-flops, thereby reducing the signal load and allowing the operating speed of the design to increase. Pipelining, however requires the addition of logic gates and flip-flops to the design which could result in further increase in die size as well as greater power consumption.

SUMMARY

A multi-processor system having a group of processing units connected in a daisy chain configuration is disclosed. The system, in one embodiment, includes multiple digital processing units, a first distribution device, and a second distribution device. The digital processing units are connected in a sequence or a daisy chain configuration with a first digital processing unit located at the beginning of the sequence and the last digital processing unit located at the end of the sequence. Each digital processing unit is further configured to allow a packet stream to pass through or read a data packet from the packet stream in response to the time frame. The first distribution device, for example, can be a demultiplexer operable to send a packet stream to the first digital processing unit. The second distribution device is a multiplexer capable of receiving a packet steam from the last digital processing unit.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
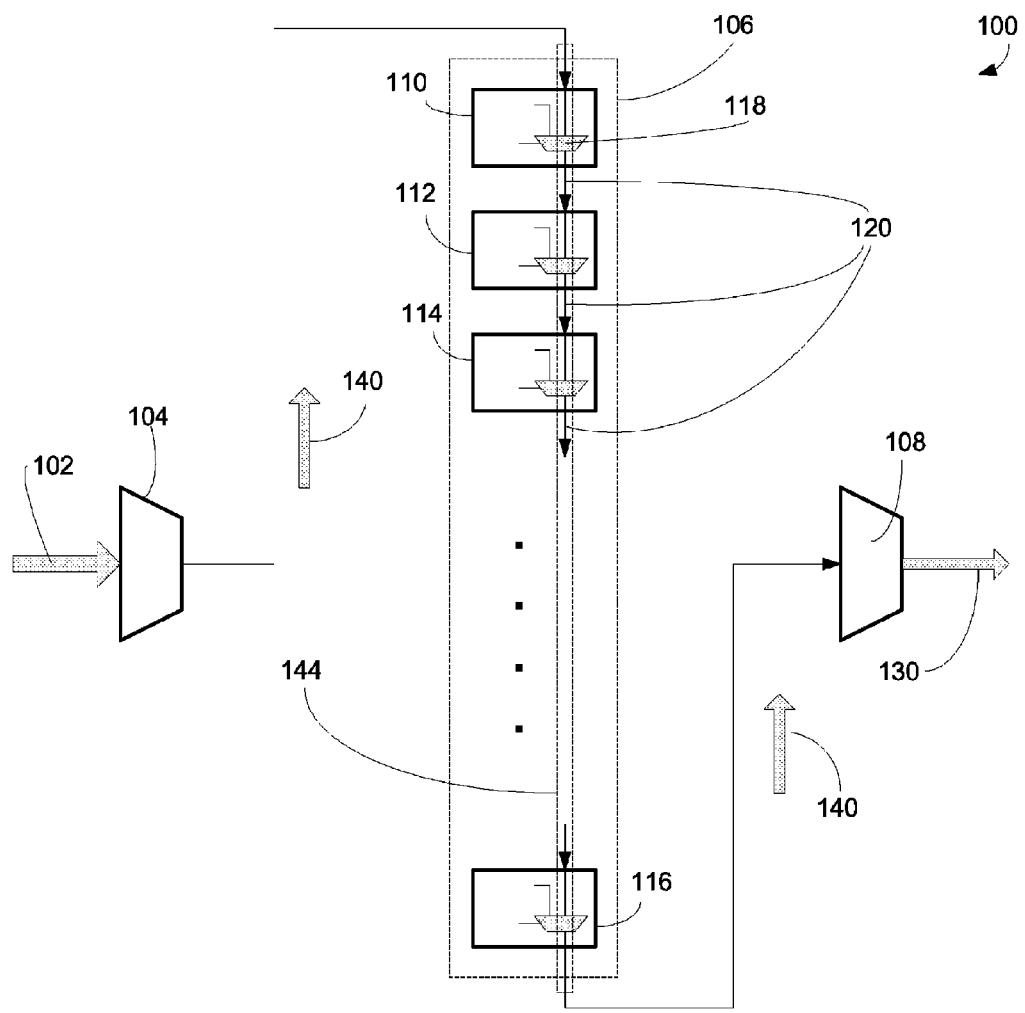
FIG. 1 is a block diagram illustrating a processing system having multiple processing units connected in a daisy chain structure in accordance with one embodiment of the present invention.

Embodiment(s) of the present invention is described herein in the context of a method, device, and apparatus of providing parallel processing using multiple processing units arranged in a sequence.

Those of ordinary skilled in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skilled in the art having the benefit of this disclosure.

In accordance with the embodiment(s) of the present invention, the components, process steps, and/or data structures described herein may be implemented using various types of operating systems, computing platforms, computer programs, and/or general purpose machines. In addition, those of ordinary skilled in the art will recognize that devices of a less general purpose nature, such as hardwired devices, field programmable gate arrays (FPGAs), application specific integrated circuits (ASICs), or the like, may also be used without departing from the scope and spirit of the exemplary embodiment(s) of inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

A processing system includes a group of processing units ("PUs") arranged in a daisy chain configuration or a sequence capable of parallel processing. The processing system, in one embodiment, includes PUs, a demultiplexer ("demux"), and a multiplexer ("mux"). The PUs are connected or linked in a sequence or a daisy chain configuration wherein a first PU is located at the beginning of the sequence and a last digital PU is located at the end of the sequence. Each PU is configured to read an input data packet from a packet stream during a designated reading time frame. If the time frame is outside of the designated reading time frame, a PU allows a packet stream to pass through. The demux forwards a packet stream to the first digital processing unit. The mux receives a packet stream from the last digital processing unit.

FIG. 1 is a block diagram illustrating a processing system 100 with multiple processing units 110-116 connected in a daisy chain structure or a sequence 106 in accordance with one embodiment of the present invention. Processing system 100, which can also be referred to as a parallel processor system or a vector parallel processing system, has a daisy-chain-interconnected architecture. System 100 includes a demultiplexer ("demux") 104, a multiplexer ("mux") 108, and multiple processing units 110-116. It should be noted that the underlying concept of the embodiment(s) of the present invention would not change if one or more blocks (circuit or circuitries) were added to or removed from system 100.

Referring back to FIG. 1, sequence 106 includes multiple digital processing units 110-116 arranged in a daisy chain or series configuration. Digital processing units 110-116 can also be referred to as processing units, processors, central processing units, vector processors, microprocessors, embedded processors, packet-processing-engines, and the like. Multiple digital processing units 110-116 may include any number of processors, such as eight (8), sixteen (16), thirty-two (32), sixty-four (64), and so on. It should be noted that the number of digital processing units does not have to be in power of two (2). Sequence 106, for example, arranges digital processing units in a daisy chain or sequence whereby the output of digital processing unit 110 is fed to the input of digital processing unit 112; the output of digital processing unit 112 is fed to the input of digital processing unit 114; and so on until a daisy chain is formed. The digital processing unit located at the beginning of the sequence may be called the first digital processing unit while the digital processing unit located at the end of the sequence is referred to as the last digital processing unit.

Demux 104 is a data distribution device and is coupled to digital processing unit 110 for distributing data streams from external devices to system 100. Demux 104 is configured to receive a data stream from an external device via bus 102, not shown in FIG. 1, and subsequently passes the data stream to sequence 106 without processing or reformatting the data stream. Alternatively, demux 104 converts or reformats the data stream(s) from bus 102 to a packet stream 140 before it is being transmitted.

Mux 108 is also a data distribution device and is coupled to a digital processing unit 116 of sequence 106. In one embodiment, mux 108 receives packet stream 140 from digital processing unit 116 and passes it to an external device, not shown in FIG. 1, via bus 130 without reformatting. Alternatively, mux 108 reformats data packets carried by packet stream 140 and forwards reformatted stream(s) to the external device(s) via bus 130.

Packet stream 140, in one embodiment, includes multiple data packets, which could further be divided into input data packets and output data packets. Packet stream 140 is capable of traveling through sequence 106 via a conduit 144. Conduit 144, in one embodiment, passes through every digital processing unit in sequence 106, and becomes an integral part of each digital processing unit. Alternatively, conduit 144 is in sequence 106 but it does not physically travel through each digital processing unit.

System 100 further includes a global clock tree configured to distribute clock signals to various components including digital processing units 110-116. System 100 further includes a controlling device, which is responsible to assign designated time frames. Each digital processing unit, in one embodiment, is assigned a designated time frame for data accessing to and from packet stream 140. The time frame is a predefined period of time duration in accordance with clock signals. For example, a time frame can be a period of two nanoseconds. A designated time frame is a period of duration with a specific starting time and ending time. System 100, in one embodiment, uses designated time frames to control which digital processing unit can access the data packets carried by packet stream 140. It should be noted that some digital processing units have the same designed time frames while other digital processing units have unique designated time frames. In one embodiment, a clock stamp(s) is encoded in the header of each packet stream 140, whereby each digital processing unit can verify time accurately.

Digital processing units 110-116, in one embodiment, include circuitry 118 and buses 120 to control when and how packet stream 140 passes through these units. For instance, circuitry 118 in digital processing unit 110 determines whether unit 110 should write a data packet to packet stream 140 before passing packet stream 140 to digital processing unit 112. Instead of using designated time frames, other addressing means such as special identification numbers ("IDs") encoded in each packet stream or each data packet may be used for data accessing.

During an operation, upon receipt of data packets via bus 102, demux 104 reformats data packets to a transmission protocol used by packet stream 140 and then sends packet stream 140 to sequence 106. It should be noted that packet stream 140, for example, should contain similar information as data packets from bus 102. Packet stream 140, in one embodiment, includes many data packets, which is capable of crossing boundaries of multiple digital processing units. For example, when a data packet in packet stream 140 arrives at unit 110 from demux 104, unit 110 passes the data packet to unit 112 if the time frame is not the designated time frame for unit 110. Alternatively, if the time frame is the designated time frame for unit 110, it writes to or reads from a data packet(s) carried or transported by packet stream 140. A digital processing unit, for example, may write and read data packets from packet stream 140 at the same designated time frame. It should be noted that when packet stream 140 travels through conduit 144, it may contain both input data packets as well as output data packets. After receipt of data packets carried by packet stream 140 from unit 116, mux 108 outputs the data packets via bus 130.

An advantage of having a parallel processing system arranged in a sequence or a daisy chain configuration is to alleviate routing congestion. For example, by adopting the daisy-chain-interconnect architecture, the on-chip routing congestion should be reduced. Accordingly, a daisy-chaininterconnect architecture of a parallel processing system enhances computing performance with reduced die size.

Figure 2:
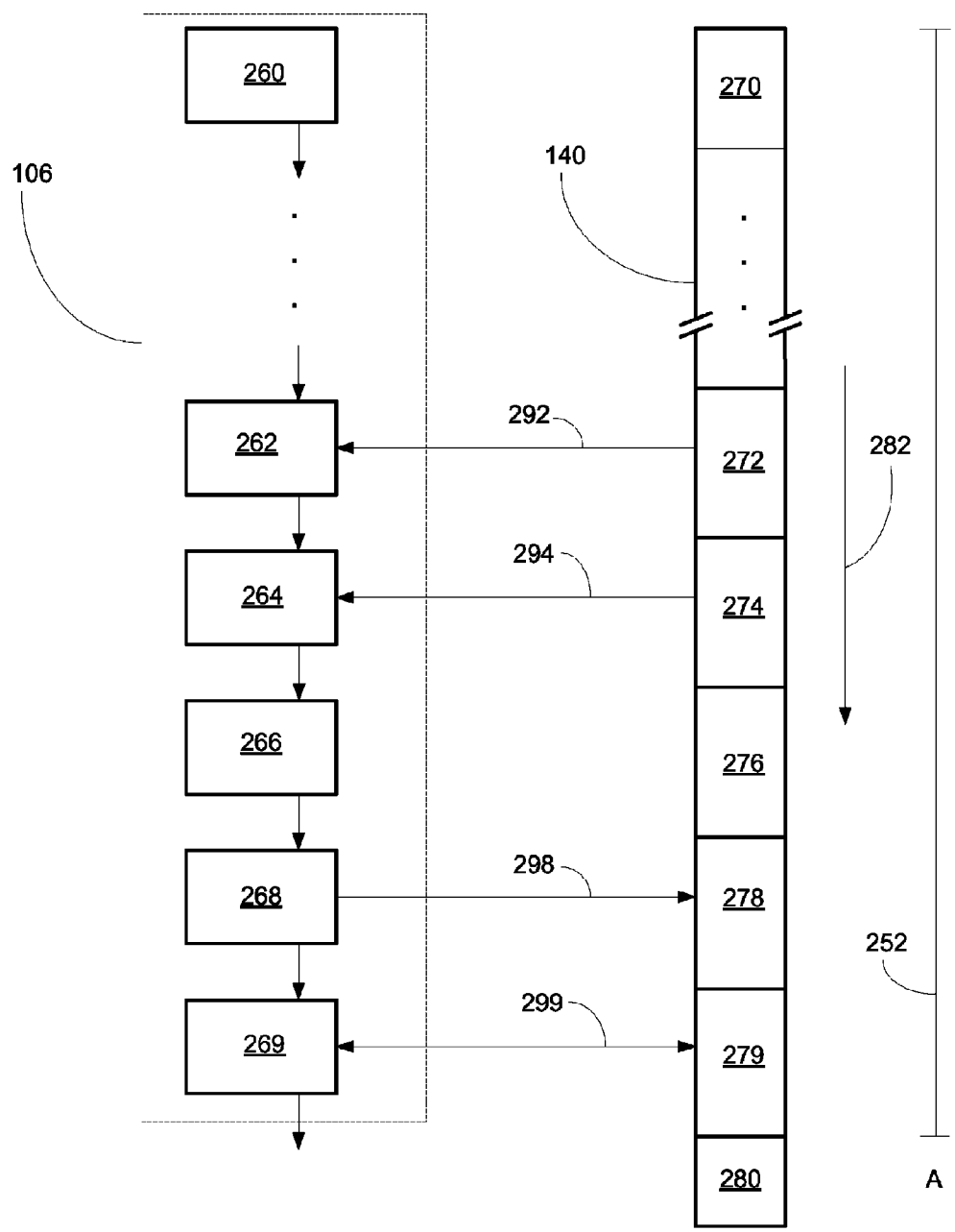
FIG. 2 is a block diagram illustrating a processing system capable of accessing the packet stream in accordance with one embodiment of the present invention.

FIG. 2 is a block diagram 250 illustrating a processing system capable of accessing the packet stream in accordance with one embodiment of the present invention. System 250 includes a sequence 106 and a packet stream 140 wherein sequence 106 includes multiple processing units ("PUs") 260-269. PUs 260-269, in this embodiment, are arranged in a daisy chain configuration wherein PU 260 is the first PU while PU 269 is the last PU of the daisy chain. It should be noted that the underlying concept of the exemplary embodiment(s) of the invention would not change if one or more blocks (circuit or circuitries) were added to or removed from system 250.

Packet stream 140 includes a header 280 and multiple data packets 270-279 wherein some data packets contain input data while other data packets carry output data. In one embodiment, each data packet is further divided into multiple sub-packets wherein some sub-packets are designated for input data while other sub-packets are allocated for output data. Header 280 includes information relating to packet stream 140, such as size of the stream and time stamp(s). Packet stream 140 is configured to travel through every PU in sequence 106 starting at the first PU 260. In one embodiment, entire packet stream 140 arrives (and stays) at one PU at a given time frame and the entire packet stream travels one PU at a time through the entire sequence 106. For example, PU 262 passes an entire packet stream 140 to PU 264 at a next clock cycle. Alternatively, packet stream 140 is capable of crossing boundaries of PUs. For instance, the header 280 of packet stream 140 may have existed from sequence 106 already while the last data packet has just arrived at the first PU 260 as indicated in FIG. 2.

Every PU in sequence 106 uses the designated time frame to determine when to access data packets carried by packet stream 140. A PU may allow packet stream 140 to pass without accessing the data packets if the time frame is outside of the designated time frame. For example, PU 266 passes a portion of packet stream 140 or a data packet to PU 268 without data accessing if the time frame is not the designated time frame for PU 266. Data accessing, for example, includes writing data to or reading data from packet stream 140. Packet stream 140, as shown in FIG. 2, flows in a direction from PU 260 to PU 269 as indicated by arrow 282. It should be noted that depending on the size of packet stream 140 and the clock cycle, packet stream 140 can cross boundaries of multiple PUs.

During an operation, when time frame reaches at time frame A 252, some PUs are allowed to access the data packets while other PUs are not permitted to access. For example, PUs 260 and 266 are not permitted to access data packets in packet stream 140. PUs 262-264, on the other hand, are allowed to read data packets 272-274 from packet stream 140 via connections or buses 292-294. Also, PU 268 is allowed to write data packet 278 via bus 298 and PU 269 is allowed to write and read data packet 279 via bus 299 in the same time frame. It should be noted that data packets 270-279 may further be divided into sub-data packets for reading and writing during the same time frame. It should be further noted that packet stream 140 may be located within sequence 106, in which packet stream 140 passes through every PU from PU 260 to PU 269.

Figure 3:
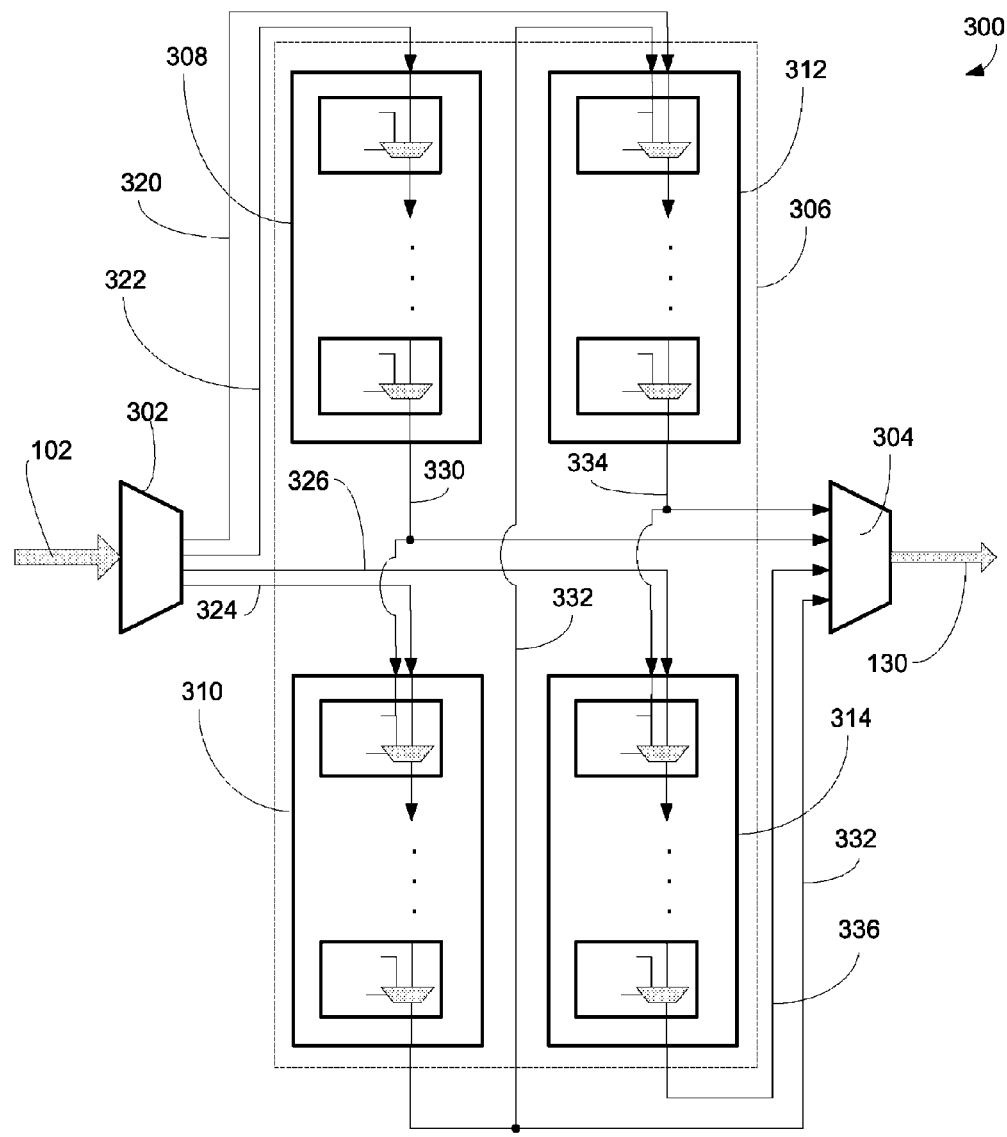
FIG. 3 is a block diagram illustrating a processing system having four banks of processing units in accordance with one embodiment of the present invention.

FIG. 3 is a block diagram illustrating a processing system 300 having four banks of processing units in accordance with one embodiment of the present invention. Processing system 300 includes a processing device 306, a demux 302, and a mux 304, wherein processing device 306 further includes four (4) banks or packs of PUs and/or packet-processing-engines ("PPEs") 308-314. It should be noted that additional blocks (circuit or circuitries) can be added to system 300. An advantage of organizing PUs or PPEs into a multi-banks configuration is to improve latency. Ultimately, each design has to trade off routing congestion with packet latency and arrive at the right balance. For example, instead of receiving output packets from the last PU in bank 314 via bus 336, mux 304 can receive output packets from all banks 308-314 via bus 330-336.

Each bank may include multiple PUs, such as eight (8), sixteen (16), thirty-two (32), sixty-four (64), and so on. It should be noted that the number PU does not have to be in power of 2. Banks 308-314, in one embodiment, are interconnected in a daisy chain configuration via buses 320-336. For example, a packet stream can travel from bank 308 to bank 310 via bus 330 and then it continues to travel from bank 310 to bank 312 via bus 332. After bank 312, the packet stream proceeds from bank 312 to bank 314 through bus 334. It should be noted that mux 304 can capture output data from buses 330-336 if the data is available to reduce the delay occurred due to the long sequence.

Demux 302 is capable of distributing four packet streams to inputs of four banks 308-314 via buses 320-326. Mux 304 is configured to receive four output packet streams from four banks 308-314 via buses 330-336. For example, demux 302 uses buses 320-326 to distribute input data packets to banks 308-314. Upon receipt of output data packets from buses 330-336, mux 304 generates an output packet stream in accordance with the output data packets, and subsequently, transmits the output packet stream to external devices via bus 130. To increase system performance, PUs of banks 308-314 can process data in parallel.

Referring back to FIG. 3, each bank includes a sequence of PUs connected in a daisy chain structure. PUs can also be referred to as digital processing units, processors, central processing units, vector processors, microprocessor, embedded processors, and the like. A daisy chain or sequence of PUs is organized in such a way that the output of a PU is fed to the input of the next PU in the sequence. It should be noted that the input of the first PU of every bank is connected to demux 302 and the output of the last PU of each bank is connected to mux 304.

System 300, in one embodiment, includes a global clock tree that is used to distribute clock signals to various components including every PU in each bank. Each PU in a bank is assigned a designated time frame for data accessing. It should be noted that some PUs have the same designed time frames. Alternatively, a unique designated time frame is assigned to each PU. In another embodiment, the clock stamp(s) distributed by the clock tree is encoded in the packet stream whereby each PU can verify time accurately.

In operation, upon receipt of data packets over bus 102, demux 302 is capable of decomposing the data packets to form four separate packet streams. Four packet streams are subsequently sent to banks 308-314 using buses 320-326. After arrival of the packet streams, PUs in each bank process the packet stream in accordance with the designated time frames. It should be noted that packet stream may carry data packets for input as well as for output when it travels through the bank. Mux 304 collects output packet streams from banks 308-314 via buses 330-336 and combines output packet streams to form an output stream, which is subsequently sent to external devices via bus 130.

Alternatively, bank 308-314 can also be configured in a sequence and used as a daisy chain configuration. For example, demux 302 sends a packet stream to bank 308, and the packet stream travels through banks 310-314 via buses 330-334. Mux 304 receives the packet stream carrying output data packets from bank 314 via bus 336. An advantage of using the bank/pack configuration is to provide a balance between routing congestion and time delay associated with a sequence.

The daisy-chain-interconnect architecture using multiple banks configuration can result in reduced die sizes, fast clock cycles, and power conservation. It should be noted that system 300 may include more than four (4) banks. For example, system 300 can have eight (8) banks, sixteen (16) banks, thirty-two (32) banks, and so on. The number of banks employed is not necessary to have a 2-power number.

Figure 4:
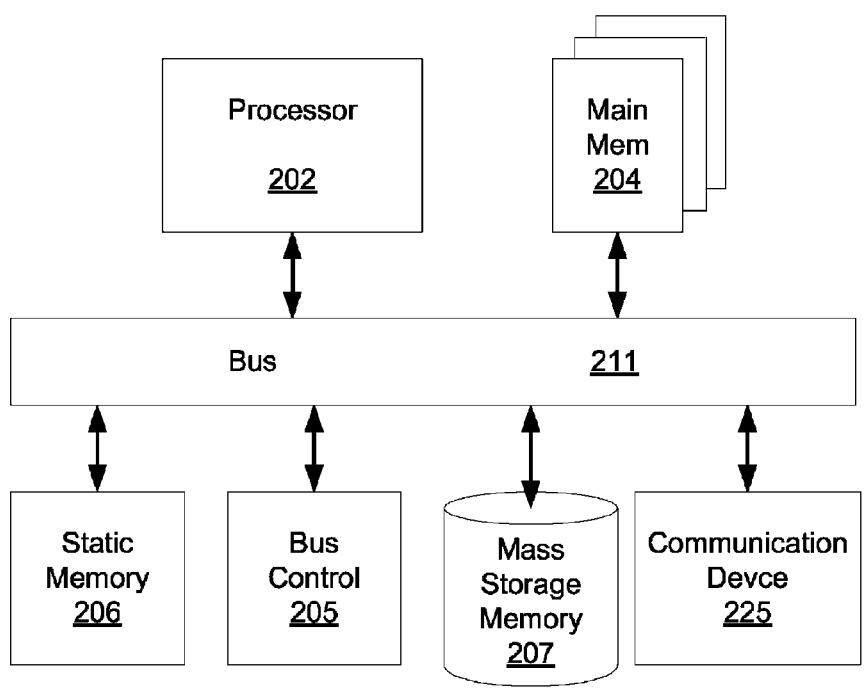
FIG. 4 is a block diagram illustrating a processing unit used in a sequence of processing units in accordance with one embodiment of the present invention.

Having briefly described embodiment(s) of a group of PUs configured in a daisy chain structure in which the embodiment(s) of the present invention operates, FIG. 4 illustrates a block diagram of a PU in accordance with one embodiment of the present invention. Computer system 200 includes a processor 202, a main memory 204, an interface bus 211, a static memory device 206, a bus control unit 205, a mass storage memory 207, and a communication device 225. Bus 211 is used to transmit information between various components and processor 202 for data processing. Processor 202 may be any of a wide variety of general-purpose processors, embedded processors, or microprocessors such as ARM® embedded processors, Intel® Core™2 Duo, Core™2 Quad, Xeon®, Pentium™ microprocessor, Motorola™ 68040, AMD® family processors, or Power PC™ microprocessor.

Main memory 204, which may include multiple levels of cache memories, stores frequently used data and instructions. Main memory 204 may be RAM (random access memory), MRAM (magnetic RAM), or flash memory. Static memory 206 may be a ROM (read-only memory), which is coupled to bus 211, for storing static information and/or instructions. Bus control unit 205 is coupled to bus 211 and controls which component, such as main memory 204 or processor 202, can use the bus. Bus control unit 205 manages the communications between bus 211 and other components. Mass storage memory 207 may be flash memories for storing large amounts of data. Communication device 225 is coupled to bus 211 for controlling communications between computer system 200 and other devices such as network communications devices.

The exemplary embodiment of the present invention includes various processing steps, which will be described below. The steps of the embodiment may be embodied in machine or computer executable instructions. The instructions can be used to cause a general purpose or special purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components. While embodiments of the present invention will be described with reference to the Internet, the method and apparatus described herein are equally applicable to other network infrastructures or other data communications environments.

Figure 5:
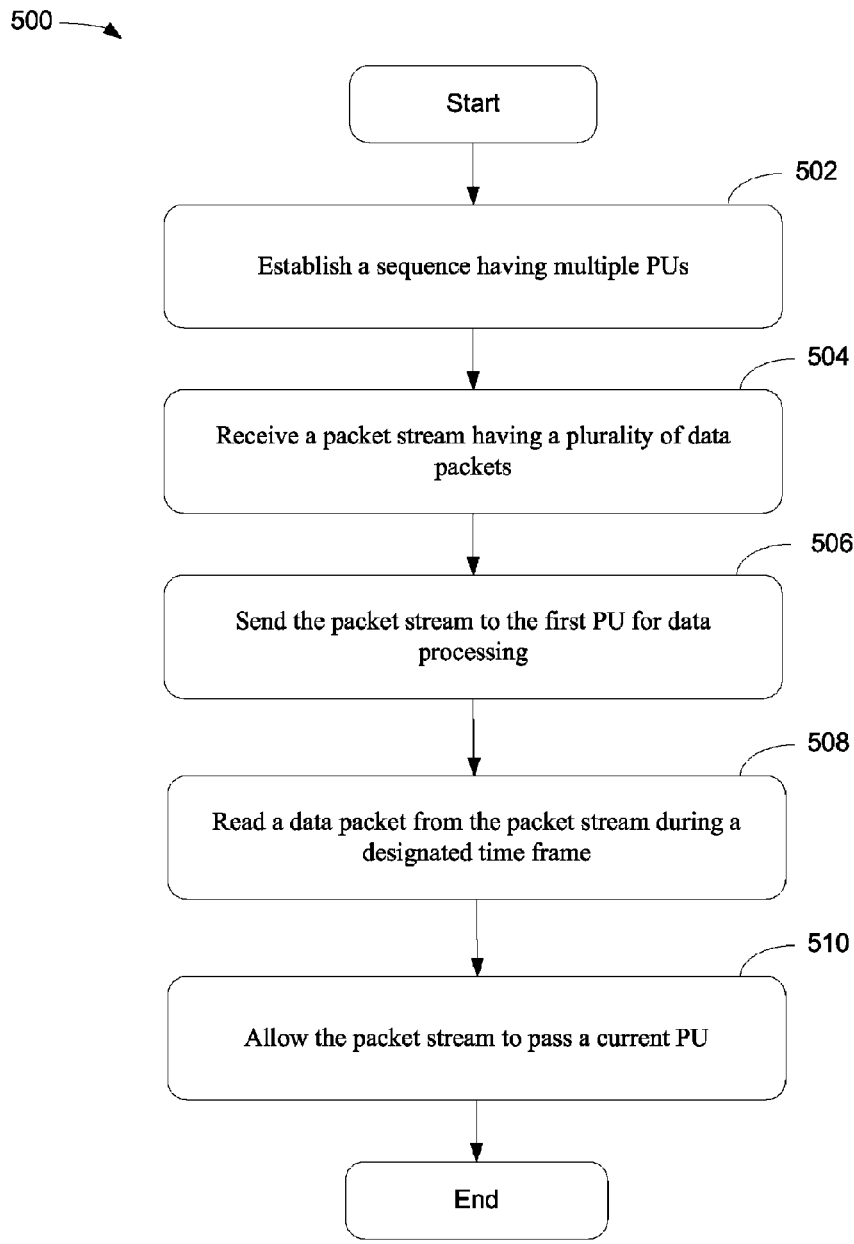
FIG. 5 is a flowchart illustrating a process of providing parallel processing using multiple processing units arranged in a daisy chain configuration in accordance with one embodiment of the present invention.

FIG. 5 is a flowchart 500 illustrating a process of providing parallel processing using a sequence of processing units ("PUs") in accordance with one embodiment of the present invention. At block 502, the process establishes a sequence or a daisy chain configuration of multiple PUs. The sequence, in one embodiment, has a first PU, which is located at the beginning of the sequence and a last PU, which is located at the end of the sequence. After block 502, the process proceeds to the next block.

At block 504, the process receives a packet stream having multiple data packets from an external device. For example, the external device may be a network communications device. The process subsequently assigns a designated time frame to each PU for data accessing. Data accessing, for example, includes writing to or reading from one or more data packets from a packet stream. It should be noted that a data packet may be divided into multiple sub-sections for reading and writing at the same or substantially same time. After block 504, the process proceeds to the next block.

At block 506, the process sends the packet stream or a portion of the packet stream to the first PU of the sequence for data processing. If PUs are organized in banks or packs, the process is also capable of sending multiple packet streams or portions of the packet streams to various banks. After block 506, the process proceeds to the next block.

At block 508, the process reads or retrieves a data packet or data packets from the packet stream during the designated time frame. The process is capable of identifying the current time frame in accordance with clock signals or the time stamp encoded in the header of packet stream. Upon determining the current time frame, the process permits PUs to access data packets if their designated times match with the current time frame. After block 508, the process proceeds to the next block.

At block 510, the process allows the packet stream or a portion of the packet stream to pass PUs if their designated time frames do not match with the current time frame. For example, when a PU determines that its designated time frame does not match with the current time frame, it passes the packet stream from the previous PU to the next PU in the sequence without accessing any data packet(s). Designated time frame, in one embodiment, can be further divided into an input designated time frame and an output designated time frame. While the input designated time frame is used for reading data packet(s) from the packet stream, the output designated time frame is used for writing data packet(s) to the packet stream. The process allows the packet stream to transport input data packets and output data packets at the same or substantially same time. Alternatively, the process permits PUs to read data packets at different sections of the packet stream at the same or substantially same designated time frame. It should be noted that, in some instances, each PU has the exclusivity for accessing a portion of the packet stream during the designated time frame. The packet stream from the last PU in the sequence is obtained by a mux, which subsequently sends the packet stream to external device(s). After block 510, the process ends.

It should be noted that a parallel processing system using a daisy chain configuration of PUs can reduce routing congestion. While particular embodiments of the present invention have been shown and described, it will be obvious to those skilled in the art that, based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A processing system, comprising:
   a plurality of digital processing units connected in a sequence having a first digital processing unit located at beginning of the sequence and a last digital processing unit located at end of the sequence, wherein each one of the plurality of digital processing units is configured to allow a packet stream to pass through and capable of reading an input data packet from the packet stream during a designated time frame;

a first distribution device coupled to the plurality of digital processing units and operable to forward the packet stream to the first digital processing unit;

a second distribution device coupled to the plurality of digital processing units and operable to receive the packet steam from the last digital processing unit; and a global clock tree coupled to the plurality of digital processing units and configured to distribute clock signals to the plurality of digital processing units, wherein the plurality of digital processing units is a plurality of packet-processing-engines, the first distribution device is a demultiplexer, and the second distribution device is a multiplexer.

2. The system of claim 1, wherein the sequence includes one of eight (8), sixteen (16), thirty-two (32), and sixty-four (64) packet processing engines forming a daisy chain for parallel processing.

3. The system of claim 1, further comprising a controlling device coupled to the plurality of the digital processing units and configured to assign a designated time frame for every digital processing unit to access the packet stream.

4. The system of claim 1, wherein a sequence is a daisy chain of interconnected packet processing engines; and wherein the packet stream travels through the daisy chain from the first digital processing unit to the last digital processing unit.

5. The system of claim 1, wherein each digital processing unit allows the packet stream to pass through from previous digital processing unit to next digital processing unit in the sequence without accessing the packet stream when time frames are outside of the designated time frame.

6. The system of claim 1, wherein the packet stream includes a plurality of input data packets and output data packets.

7. The system of claim 6, wherein the designated time frame includes an input designated time period and an output designated time period.

8. A method for parallel processing, comprising:

establishing a sequence of multiple packet processing engines ("PPEs") having a first PPE situated at beginning of the sequence and a last PPE situated at last of the sequence;

receiving a packet stream having a plurality of data packets;

sending the packet stream from a demultiplexer to the first PPE for information processing;

distributing designated times to PPEs in accordance with a global clock tree;

reading a data packet from the packet stream during a designated time frame for a designated PPE;

allowing the packet stream to pass a current packet processing engine from a previous PPE to next PPE in the sequence without accessing the packet stream if current time frame is outside of the designated time frame for the current PPE; and forwarding the packet stream from the last PPE to a multiplexer.

9. The method of claim 8, further comprising outputting an output data packet from a PPE to the packet stream during an output designated time frame.

10. The method of claim 9, further comprising allowing the packet stream to transport the input data packets and the output data packets.

11. The method of claim 8, further comprising permitting multiple PPEs to read data packets at different sections of the packet stream at a substantially same designated time frame.

12. The method of claim 8, wherein establishing a sequence of multiple PPEs further includes arranging a plurality of processing units in a configuration of a daisy chain having a first processing unit situated at beginning of the daisy chain and a last processing unit situated at last of the daisy chain.

13. The method of claim 8, further comprising allowing the packet stream to pass through the sequence with high clock speed.

14. An apparatus for a computer network having a plurality of processing units capable of providing parallel processing, comprising:

means for establishing a sequence of multiple packet processing engines ("PPEs") having a first PPE situated at beginning of the sequence and a last PPE situated at last of the sequence;

means for receiving a packet stream having a plurality of data packets;

means for sending the packet stream from a demultiplexer to the first PPE for information processing;

means for distributing designated times to PPEs in accordance with a global clock tree;

means for reading a data packet from the packet stream during a designated time frame for a designated PPE;

means for allowing the packet stream to pass a current PPE from a previous PPE to next PPE in the sequence without accessing the packet stream if current time frame is outside of the designated time frame for the current PPE; and means for forwarding the packet stream from the last PPE to a multiplexer.

15. The apparatus claim 14, further comprising means for outputting an output data packet from a PPE to the packet stream during an output designated time frame.

16. The apparatus of claim 15, further comprising means for allowing the packet stream to transport the input data packets and the output data packets.

\* \* \* \* \*

UNITED STATES PATENT AND TRADEMARK OFFICE
CERTIFICATE OF CORRECTION

| | | |
|---|---|---|
| PATENT NO. | : 8,074,054 B1 | |
| APPLICATION NO. | : 11/954718 | |
| DATED | : December 6, 2011 | |
| INVENTOR(S) | : Venkata Rangavajjhala and Naveen K. Jain | |

It is certified that error appears in the above-identified patent and that said Letters Patent is hereby corrected as shown below:

Col. 10, line 46 In CLAIM 15, insert --of-- between "apparatus" and "claim".

Signed and Sealed this
Thirty-first Day of January, 2012

David J. Kappos
*Director of the United States Patent and Trademark Office*